(12) United States Patent
Rotter (10) Patent No.: US 8,383,225 B2
(45) Date of Patent: Feb. 26, 2013

(54) VACUUM-INSULATION ELEMENT (75) Inventor: Thomas Rotter, Hochheim-Massenheim (DE)

(73) Assignee: Thomas Rotter, Hochheim-Massenheim (DE)

( * ) Notice: Subject to any disclaimer, the term of this patent is extended or adjusted under 35 U.S.C. 154(b) by 189 days.

(21) Appl. No.: 12/934,222

(22) PCT Filed: Mar. 24, 2009

(86) PCT No.: PCT/EP2009/002147
§ 371 (c)(1),
(2), (4) Date: Jan. 14, 2011

(87) PCT Pub. No.: WO2009/118154
PCT Pub. Date: Oct. 1, 2009

(65) Prior Publication Data
US 2011/0183119 A1   Jul. 28, 2011

(30) Foreign Application Priority Data

Mar. 26, 2008  (EP) .................................... 08005606
Oct. 16, 2008  (EP) .................................... 08018167

(51) Int. Cl.
*B32B 3/30* (2006.01)
*F16L 59/065* (2006.01)
(52) U.S. Cl. ......................................... 428/69; 428/180
(58) Field of Classification Search ................... 428/69, 428/180
See application file for complete search history.

(56) References Cited

U.S. PATENT DOCUMENTS

| 3,397,720 A | 8/1968 | Jones |
| 5,011,729 A | 4/1991 | McAllister |

FOREIGN PATENT DOCUMENTS

| DE | 23 49 401 | 4/1975 |
| DE | 295 19 767 | 2/1996 |
| WO | WO 2005/038166 | 4/2005 |

*Primary Examiner* — Alexander Thomas
(74) *Attorney, Agent, or Firm* — Reising Ethington PC (57) ABSTRACT

A vacuum insulation element, which consists of a multi-layer configuration of at least two molded plates, that can be subjected to a vacuum, wherein the molded plates in each case have a surrounding edge region which in each case form a sealing surface, wherein the sealing surfaces of the molded plates are hermetically bonded together in the assembled state thus forming a sealing frame, such that a cavity between the, at least two, molded plates is sealed in a manner that is vacuum-tight, and the structure of the, at least two, molded plates distributes the atmospheric pressure which is applied to the multi-layer configuration when subjected to a vacuum such that the specified structure remains stable, wherein the molded plates have numerous molded structural elements in the shape of projections and depressions which face in opposite directions from the molded plates and the projections, or respectively, depressions which face the other plate respectively rest against each other thereby forming a grid of support points when subjected to a vacuum, and the projections, or respectively, depressions which face away from the other plate respectively form numerous cavity cells which can be subjected to a vacuum between the support points, wherein the cavity cells are connected in such a manner that they communicate with one another, and as a whole, form the cavity.

19 Claims, 6 Drawing Sheets

VACUUM-INSULATION ELEMENT

FIELD OF THE INVENTION

The present invention concerns in general an insulation element and in particular a vacuum insulation element consisting of numerous molded plates arranged vertically, wherein the spaces between the molded plates can be subjected to a vacuum.

BACKGROUND OF THE INVENTION

In times of increasing energy costs, there is a strong interest in various fields for the possibility of conserving energy or using said more effectively. One possible measure in areas which use a great deal of energy such as thermal insulation is to improve the effectiveness of the energy used wherein needless energy loss is avoided. In particular, the cooling and heating of devices (e.g. refrigerators and ice-chests, boilers, hot-water tanks—e.g. for solar panels, washing machines), buildings or vehicles is energy-intensive, wherein frequently the problem exists that insulation requires more space than is available.

Furthermore, there is a desire for upgrading techniques wherein the existing devices, buildings or vehicles can be better insulated retroactively.

Various systems are known for insulating devices or buildings. The patent specification DE 689 28 547 T2 describes, for example, an ultra-thin compact vacuum insulation material which consists of thin metal plates welded together in an airtight manner. In order to avoid collapse of the plates when subjected to a strong vacuum, spacing elements are placed between the plates. In accordance with the invention, spacing elements can be glass or glass-ceramic spheres or a thin (glass) textile with projections, e.g. spheres or rods. In particular, the positioning, in accordance with the invention, of the spheres is however labor intensive and requires numerous additional procedural steps in the production of said.

The patent specification DE 691 22 249 T2 discloses a very similar technology which is distinguished in that it makes use of a single spacing element consisting of a single piece instead of numerous individual spacing elements. The spacing element in accordance with the invention consists thereby of a thin, rigid support panel which separates the walls of the thermal insulation plate to be voided with numerous projections. It is also possible to use multiple panels of this type stacked on top of each other. The walls and support panel thereby consist of different materials, specifically metal and a material having a lower thermo-conductive property (e.g. glass coated with enamel).

These thermal insulating plates have the disadvantage that they are relatively expensive to produce as a separate production of plates and support panels of different materials is required. Furthermore, comparatively heavy materials are uses.

As a representative of other patents in this field, for the sake of completeness, reference is made to the EP 1 475 486 B1, which discloses vacuum insulation panels. The vacuum insulation panels according to the invention consist of a flat thermal insulating layer (foam, fibrous material, or microporous insulating material) with a casing of a metallic foil which is welded in an airtight manner and voided. The panels are parallelepiped such that they may be placed next to each other without gaps, despite the welding seams.

Due to the thin walled casing of the panels with metallic foil, these insulation elements are vulnerable. Already in the installation phase the metallic foil can be easily damaged when being glued or in extensive foaming constructions, wherein the vacuum is sacrificed. It is also problematic that insulation elements of this type have a relatively large dimensional tolerance.

Double walled nucleus elements subjected to a low vacuum are known from the OS 23 49 401, with which, for example, pyramidal elevations can be formed lying between their linear support strips. The elements are supported by ridges and cushions, wherein the production of the elements and the connecting of said seems to be quite complicated and thereby expensive. Furthermore, thermal stress and/or displacement could occur, such that an arrangement of this complexity would appear to be delicate and subject to damage. It is also not clear that such an arrangement is sufficiently durable.

SUMMARY OF THE INVENTION

The present invention therefore has the basic objective of providing a simple, cost-effective vacuum insulation element which, on one hand has high thermal insulation properties and is light, stable, sturdy and of reasonable dimensions, and on the other hand, as part of the original equipment, but also for retrofitting, can be easily installed without a great deal of expense.

The objective of the invention is achieved through the object in claim 1; advantageous embodiments of the invention are defined in the dependent claims.

In accordance with the invention, a vacuum insulating element which can be voided is provided which consists of at least two molded plates wherein the individual plates are hermetically connected by means of at least one encompassing sealing frame and at least one encompassing sealing surface.

In the framework of this invention, molded plates are understood to be morphologically structured objects, which for the most part, however, have a sheet-like shape. This sheet-like shape can be bowed in order that the vacuum isolation element can be fitted to rounded surfaces. For example, by this means, the vacuum insulation element can be fitted to a curved skylight.

In accordance with claim 1, the molded plates display numerous structural elements when laid flat, which project alternately upwards and downwards, or in opposite directions respectively, which deviate from the plane of symmetry in the plates. For this, structural elements which project downwards are referred to as depressions and structural elements which project upwards are referred to as projections, wherein it is clear that "upwards" and "downwards" are not absolute directions in space as the elements can be used in any orientation and moreover are mirror-symmetrical. The shape of these structural elements is tailored to the needs, on one hand regarding stability, and on the other hand, in regard to the least possible heat transfer through the vacuum insulation element. A stable form with limited heat transfer can encompass the statics of dome oriented structural elements, e.g. having curved cross-sections. It is also possible however, to have structural elements which, in conjunction with neighboring plates, display a honeycombed cross-section.

The arrangement of the individual structural elements of the molded plates is such that when they lie on top of each other, the projections are directly opposite the depressions of neighboring plates such that these integral, in particular, dome shaped, structural elements are supported against each other when assembled and such that they serve as points of support between neighboring molded plates. In other words, the projections, or respectively, depressions which face neighboring plates abut projections, or respectively, depressions, of the neighboring plate which are facing said plate. The points of support are distributed in a grid, wherein the term "grid" can also refer to irregular distributions. The other projections or depressions which are facing away from the other, neighboring plate, together with the projections or depressions of the other neighboring plate, which are facing away from the first plate, form cavity or box section cells, which are connected to each other, or communicate with one another. The collective cavity cells between the neighboring plates form thereby a common cavity, which is subjected to a vacuum. In this manner there is always one cavity less than the number of plates used. When four molded plates are used, there are, accordingly, three cavitys, and when two molded plates are used, one cavity is formed.

In other words, the projections and depressions of the first (bottom) plate and the corresponding depressions of the second (upper) plate form point shaped positions of plate material which support each other when a vacuum has been applied, thereby forming an integral point-grid of support points. The point-grid has the advantage of reduced surface contact, thus keeping the thermo-conductive property at a minimum. In this context, "point position" and "point-grid" are clearly not meant in the mathematical sense, but rather, the "points" form contained surfaces which are as small as possible, e.g. of one or a few square millimeters. The advantage over linear shaped strips is, in particular, that the individual cavity cells between the dot shaped support points are connected such that they communicate directly with each other already, without the need for additional spacing elements, and an alternating structure of this type is very stable.

The molded depressions of the first plate and the corresponding molded projections of the second plate face away from each other, thus forming the numerous cavity cells which can accommodate a vacuum between the support points, wherein the cavity cells are connected in such a manner that they communicate with one another, collectively forming the entire cavity which is to be voided.

The projections and depressions of both plates are shaped in two dimensions in a dome-like manner from the respective plates thereby and the dome-like projections and dome-like depressions alternate in the two dimensions of the plane of the plates such that the dome-like projections are encompassed directly on all four sides, or respectively, in both dimensions of the plane of the plate on each side, by dome-like depressions in each case. Along the hypothetic line connecting the peaks of the dome-like projections, projections and depressions alternate accordingly in both dimensions, perpendicular to each other, of the plane of the plate, in a manner similar to that of a waffle.

In particular, the depressions of the lower, first plate and the corresponding projections of the upper, second plate also form point positions made of the plate material, between which, in each case, one of the cavities is formed. As a result, there is a valley between two neighboring projections on each of the molded plates, forming a saddle point. The saddle points are encompassed therefore, on both sides in one dimension of the plane of the plate, by projections and in the dimension of the plane of the plate, perpendicular to this, by depressions.

In particular, the molded plates substantially have a uniform thickness for the most part, where the depressions of the one side of a plate also form the projections of the other side of said plate.

In order to obtain a good degree of thermal insulation, the hollow spaces are subjected to a vacuum. The collapsing of the vacuum insulation element as a result of the application of a vacuum is thereby advantageously avoided as a result of the structure of the molded plates. The molded plates are therefore constructed in such a manner, advantageously, such that the atmospheric pressure applied to the molded plates after they have been voided is distributed such that they maintain the predefined structure, or respectively, the structure is not significantly compressed. Because the shape of the vacuum insulation element is only minimally altered by the vacuum, it is advantageously possible to produce vacuum insulation elements with very precisely defined dimensions.

In particular, in this respect, specific structures of the molded plates are preferred, which are oriented on the static solutions for arches known from architecture. A particularly preferred embodiment of the invention makes use, therefore, of a dome-like structure for the cavity cells between the supported regions, or respectively, an arch-like depression structure is created. The supported regions thereby form pillars, which support the arches. Accordingly, the plates exhibit a structure of arched domes in two dimensions alternating in opposite directions; in other words, they have a structure similar to an egg carton. Molded plates of this type are also referred to in some cases as studded sheets.

The molded plates may also contain bridge-like structural elements which fulfill the stability requirements. The mutually supporting structural elements form thereby the buttresses of these "bridges" and the cavity cells lying between them form "archways." In particular, the buttresses may be connected to each other by archways, wherein the buttress is the starting point for numerous, as an example, oriented at right angles to each other, bridges, and the bridges serve as foundation for the arch construction which spans the bridges.

A preferred embodiment of the invention intends that the vacuum insulating element is voided as desired and then can be re-inflated. This can be achieved by implementation of valves. If an embodiment of this type is used, for example, for the insulation of buildings or greenhouses, a vacuum pump can be installed advantageously in the building, wherein the vacuum insulation elements can be voided as needed when insulation is desired. If insulation is not desired, for example when thermal convection from sunlight is to be made use of, the vacuum insulation elements can be re-inflated.

If, on the other hand, a variable insulation of this type is not necessary, in particular if the vacuum insulation elements according to the invention are to have a permanent insulating effect, such as is the case, for example, with refrigerating devices, then the installation of comparably expensive valves and vacuum pumps can be eliminated. In a further advantageous embodiment of the invention, for such cases an integrally molded suction nozzle is incorporated in at last one of the plates, which can be permanently closed after the vacuum has been applied.

In order to ensure a simple and speedy voiding of the individual vacuum insulation elements, the molded plates or the individual molded plate have/has at least one opening between the plates on the edges in each case, which enables the simultaneous voiding of all hollow spaces, respectively, located between neighboring plates of a vacuum insulation element, wherein only one valve, or respectively, an integrally molded suction nozzle is needed for each vacuum insulation element.

The molded plates, from which the vacuum insulation element is constructed, may be deep-drawn or in a single piece, injection molded from synthetic plates, which has the combined advantage of using cost efficient basic materials and inexpensive production methods. In this respect, PMMA, PVC, PETG, polycarbonate, epoxy, polyester, polyethylene, polystyrene, fiberglass and mixtures of these materials have been shown to be particularly suited for this purpose.

Sandwich structures are however also possible, in which the plates have different layers. This is advantageous in particular when materials are to be used that are only partially, i.e. for certain gases, airtight. A combination of materials of this type can, for example, consist of PET and polyethylene. Vapor deposition or lamination of synthetic plates with thin metallic layers or metal foils, or, where applicable, with an epoxy layer, can generally improve the sealing properties of synthetic materials. Vapor deposition with metallic layers can also at least serve in part for the reflection of infrared thermal radiation, thereby enhancing the insulating effects of the vacuum insulation element. Particularly cost efficient, for example, is the use of polystyrene sheets which are sealed with an epoxy which contains metallic substances.

Furthermore, thin glass-type, glass ceramic or ceramic molded plates, which are coated with one or more of the above specified synthetics in order to ensure that they are gas-tight, may be used. In this respect, metallic coatings are also conceivable. The specified materials have the advantage that large quantities can be produced in a cost-effective manner.

Furthermore, the molded plates can be lacquered regardless of their basic material, not only to ensure sealing against gas infiltration but also for aesthetic reasons.

Plastic is a particularly preferred material because its properties with respect to the present invention are advantageous. Important in this regard is the low weight in relation to the high stability as a result of the construction according to the invention. The vacuum insulation elements in accordance with the invention are much lighter in comparison to insulation elements known from the prior art. This low weight of the basic plastic material is of particular significance due to the integrally molded structural elements. Many insulation elements known from the prior art incorporate filler material of various types in order to avoid collapse when the element is subjected to a vacuum. These filler materials may be necessary in substantial quantities and lead to the vacuum insulation element having a not insubstantial weight. For the insulation of building facades, for example, this can be disadvantageous, because the vacuum insulation elements must be installed with a correspondingly supportive foundation structure. In accordance with the invention, these types of filler material for filling and stabilizing the hollow spaces are not necessary. As a result of the comparatively lower weight of the vacuum insulation element, it is possible to implement, advantageously, a light construction, which requires a less complicated support structure and attachment measures than is the case with conventional insulation elements.

Furthermore, transparent plastic may be used in order that the vacuum insulation elements allow for the passage of light thus making it possible for use in areas where light must be allowed to pass through them. This is, for example, intended for use where skylights or greenhouses are to be insulated.

Furthermore, plastics have the advantage that they can be extremely stable at low weights. It is possible to produce stable and relatively robust vacuum insulation elements using relatively thin plates in the range of <2 mm-5 mm, preferably 0.5 mm-3 mm. Lower material costs are not only advantageous regarding lower weights, but also enable a more cost-effective production.

In accordance with another advantageous embodiment, the molded plates can be made of metal sheets, preferably stainless steel, due to its low thermal conductive properties. This embodiment is useful when the stability of the vacuum insulation element is a priority.

If the molded plates of the vacuum insulation element according to the invention are made of plastic, they can be simply glued together or welded at the molded surrounding sealing surface, wherein they form a sealed chamber as a whole. Without loss of generality, ultra-sound welding, thermal bonding in general or solvent bonding as well, are suitable methods for this. If the molded plates are made of metal sheets, they are preferably welded together, brazed, or soldered along the sealing frame. It is advantageous that all of these processes are easy to implement, wherein the person skilled in the art has the necessary knowledge regarding how an airtight connection of the individual plates to one another can be accomplished.

With vacuum insulation, the sustainment of the vacuum is necessary for the insulation to be effective over a long period of time. This problem is particularly difficult to solve if, as is frequently the case with the prior art, the outer cover of the individual vacuum insulation elements can be damaged. There are, for example, vacuum insulation elements from the prior art which consist of Styrofoam or foam cores coated with a metal foil in which the pores are subjected to a vacuum. To save weight, the metal foil used is frequently very thin, resulting in the outer cover being subject to damage and the insulation elements must be installed in a complex manner in frames packed with foam material.

In a particularly preferred embodiment of the invention, the vacuum insulation element has one or more molded assembly edges which enable the vacuum insulation element to be attached to the object which is to be insulated or to a framework construction. The integrally molded assembly edges eliminate the need for awkward constructions in order to safely, and without the risk of injury, install the insulation elements. In this manner, the assembly edges according to the invention can be designed as mounting brackets, such that the vacuum insulation elements can be installed directly on the object to be insulated, e.g. screwed onto a wall, in an advantageous manner.

Another preferred embodiment of the invention therefore has one or more molded assembly edges of this type, which extend beyond the outermost extending structural elements. A construction of this type enables on the one hand, the installation of the elements directly on the object to be insulated, but on the other hand, prevents surface contact between the insulation and the object to be insulated. This design has the advantage that contact between the object and the insulation is extremely limited, and thereby the heat flow between both objects is further limited and the insulating effect is increased.

A lining or covering can be applied to extra molded assembly edges which extend beyond the outermost projecting structural elements on the side opposite of the installation side. On one hand, this simply serves to hide said, and on the other hand, they can be designed such that they present a foundation for further measures. In this respect a foundation for the application of stucco, for example, is a possibility.

If the vacuum insulation element is not extensively coated, e.g. if the passage of light is necessary, cover panels or cover foils—where applicable, transparent—can be applied to one or both of the molded plates at the edges of the vacuum insulation element. Particularly preferred is that the covering is bonded in an airtight manner to the outwards facing surface of the plate on the edge, in order to avoid optical detractions as a result of the infiltration of dust particles between the vacuum insulation element and the covering.

Another preferred embodiment of the invention enables the attachment of the vacuum insulation element using mounting devices by means of openings which extend through the cavity. A mounting structure of this type can be created using, for example, integrally molded tubes which run through the completed insulation element. The molded tubes can be combinations of different tube sections, wherein the individual tube sections extending from the molded plates that they run through, are molded. As an example, with a triple layered construction the tube sections of a first and second plate, which form a cavity in this region, can be shaped like a three-dimensional tube, while the tube section of a third plate, which abuts the second plate at a support point with a point shaped support surface, can simply consist of a hole in the plate. When these three sections are placed together, a continuous tube extends through the vacuum insulation element, through which the vacuum insulation element can, for example, be bolted to a wall. The combined tube sections are thereby connected to each other in an airtight manner, such that the vacuum in the cavitys between the individual molded plates is not exposed.

In accordance with another advantageous embodiment of the vacuum insulation element according to the invention, the contact surfaces of the mutually supporting projections and depressions of the molded plates in the voided state are as small as possible so that the thermal transference between neighboring plates is minimized. Particularly preferred thereby are dot shaped contact surfaces with a diameter of preferably less than 10 mm, and particularly preferred of less than 5 mm.

In a particularly simple and economical manner, a vacuum insulation element according to the invention can be produced in which identically structured molded plates are used. Because these plates have identical structures, they can be laid on top of each other in a mirror symmetric configuration. In order that each projection of a first molded plate lies over a depression in a second molded plate, and the structural elements of two neighboring plates can support each other, the plates must be arranged such that the top of the first plate is facing the top of the second plate, and the bottom of the second plate is facing the bottom of a third plate, etc. etc.

In a preferred embodiment of the invention, the structural elements are formed in the shape of a pyramid, the peaks of which alternate between extending upwards and extending downwards.

In a very stable embodiment of the invention, the molded plates consist of rows of four-sided pyramids with preferably a square base. A single pyramid row consists thereby of pyramids with the peaks extending alternately upwards and downwards and which abut on opposite sides. A molded plate consists, in accordance with the invention, of numerous such pyramid rows, wherein the pyramid rows are arranged next to each other, offset such that the peaks of neighboring pyramids point in different directions, and their bases lie in the same plane. Plates which are shaped in this manner can be laid on top of each other in a mirror symmetric manner, as described above and can be attached to each other in accordance with the invention. In the completed vacuum insulation element, the points of the pyramids of neighboring molded plates meet, thereby providing the vacuum insulation element with its stability against the atmospheric pressure of the surroundings after being subjected to a vacuum.

The mirror symmetrical configuration of identically shaped plates can also be described as a series of plates arranged as "normal," "inverse," "normal" [trans: "face-up," "face-down," "face-up"]. This results in a characteristic arrangement of the hollow spaces which, due to the pre-defined structure, are also identical, although due to the minor symmetric placement are offset from each other. If the structural elements of the molded plates also display a regular pattern, such as, for example, the pyramid shape described above, bodies can be produced, which can be placed together without gaps, that display a particularly good stability.

In order that the vacuum insulation element is stable and true to its form after being subjected to a vacuum, and the plates do not shift in an undesired manner against each other and "slide together," the assembly of the vacuum insulation elements requires a certain precision. The projections and depressions of neighboring plates must come together precisely. This need for precision can be mitigated through the insertion of an intermediate layer in accordance with the invention, and the "sliding together" of the molded plates when subjected to the vacuum can be prevented. Another preferred embodiment of the vacuum insulation element in accordance with the invention therefore contains an air permeable, preferably flat, intermediate plate between each pair of neighboring molded plates, which does not adversely affect the application of the vacuum, but increases the production tolerances.

In the following, the invention will be explained in greater detail through embodiment examples and with reference to the illustrations, wherein identical and similar elements have in part the same reference symbols and the characteristics of the various embodiments can be combined.

A BRIEF DESCRIPTION OF THE ILLUSTRATIONS

FIG. 1A partially cut-away perspective view of a double layered embodiment of the vacuum insulation element in accordance with the invention.

DETAILED DESCRIPTION OF THE INVENTION

Figure 1:
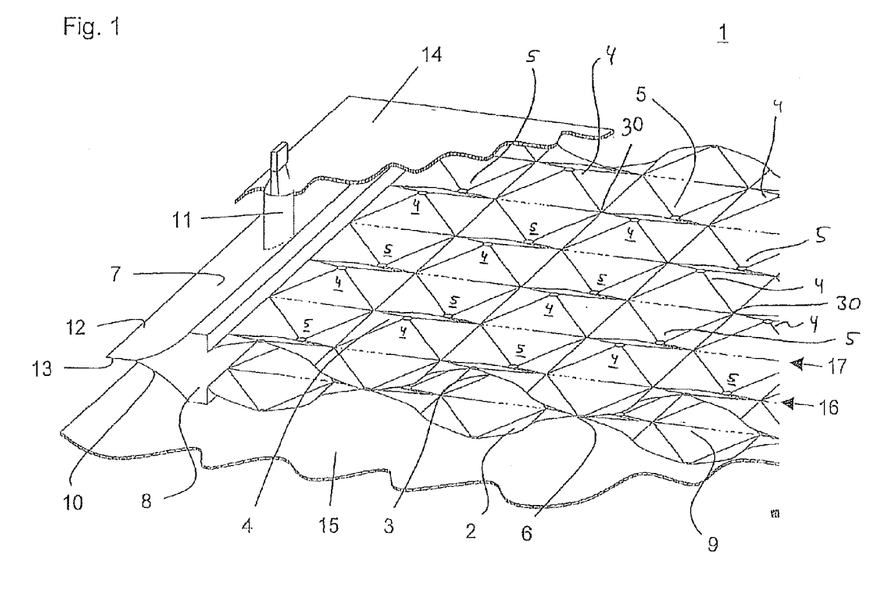
Figure 2:
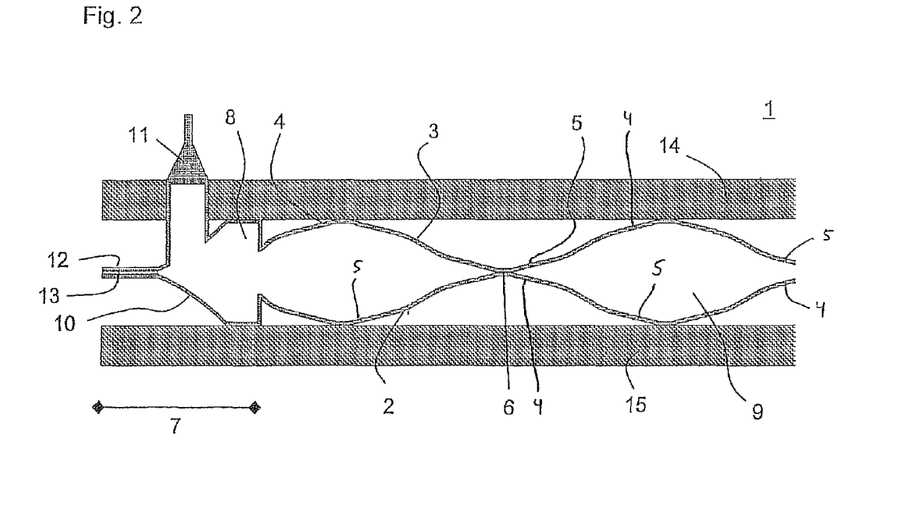
FIG. 2 A cross-section of a vacuum insulation element as shown in FIG. 1.

FIG. 1 shows a partially cut-away perspective view of a vacuum insulation element 1 according to the invention, while FIG. 2 shows a cross-section of an identically constructed vacuum insulation element 1. The vacuum insulation element 1 is constructed of two molded plates 2, 3 which are arranged on top of each other in a minor symmetric manner. The molded plates 2, 3 mutually support each other at selective points in that in each case a molded projection 4 of the lower plate 2 rests directly against a molded depression 5 of the upper plate 3, wherein basically dot-shaped contact surfaces 6 between the lower molded plate 2 and the upper molded plate 3 result, forming the point-grid of support points.

The vacuum insulation element 1 contains an encompassing edge area 7 which is subdivided radially at numerous points. Directly bordering the pyramid shaped structures 7 is a surrounding frame 8 which enables a uniform voiding of the cavity cells 9 between the two molded plates 2, 3. A flexible region 10 is incorporated in the surrounding frame 8 which serves to compensate for differences in height between the two molded plates 2, 3. An integrally molded suction nozzle 11 for voiding the cavity cells 9 is incorporated in the flexible region 10. A sealing frame 12 is obtained through the combining of the two molded plates 2, 3, which are bonded together along the surrounding sealing surface 13 in an airtight manner. The multi-layer arrangement, consisting of the two molded plates 2, 3 is covered by cover plates 14, 15 both on the top and the bottom, wherein the space between the multi-layer arrangement and the cover plates 14, 15 is not subjected to vacuum.

The molded plates 2, 3 display a pyramid-like structure, wherein the individual pyramids are four-sided, i.e. they have four pyramid sides and a square base. The peaks of the pyramids are flattened. The individual molded plates 2, 3 are constructed of rows of pyramids 16, 17. The pyramids abut on opposite sides of their bases, which are in a common plane. The peaks of the pyramids in a row of pyramids extend upwards and downwards alternately such that a series of pyramids in a row results wherein a pyramid extending upwards is followed by a pyramid extending downwards and so on. Neighboring pyramids 16, 17 are offset by one pyramid base in each case such that a pyramid of a first pyramid row 16 having a peak extending upwards is situated next to a pyramid of a second pyramid row 17 having a peak which extends downwards. In other words, a pyramid is surrounded at its base by pyramids extending in the opposite direction. Between two projections 4, in each case there is a valley with a saddle point 30.

The pyramids of the molded plates 2, 3 display structural elements wherein pyramids with peaks extending upwards correspond to projections 4 and pyramids with peaks extending downwards correspond to depressions 5. In the assembled and voided state, the projections 4 of the molded plate 2 rest against the depressions 5 of the molded plate 3. From this construction a static is obtained which distributes the load of the external atmospheric pressure applied to the vacuum insulation element over the molded plates 2, 3 such that the vacuum insulation element does not collapse, even in the voided state. Preferable in this respect are dome-like structural elements, which are also obtained by this pyramid-like structure.

Between the supporting regions, obtained by the projections 4 and the depressions 5, single, interconnected cavity cells 9 are obtained, which, when taken as a whole, i.e. the entirety between the neighboring plates 2, 3, forms a cavity.

Figure 3:
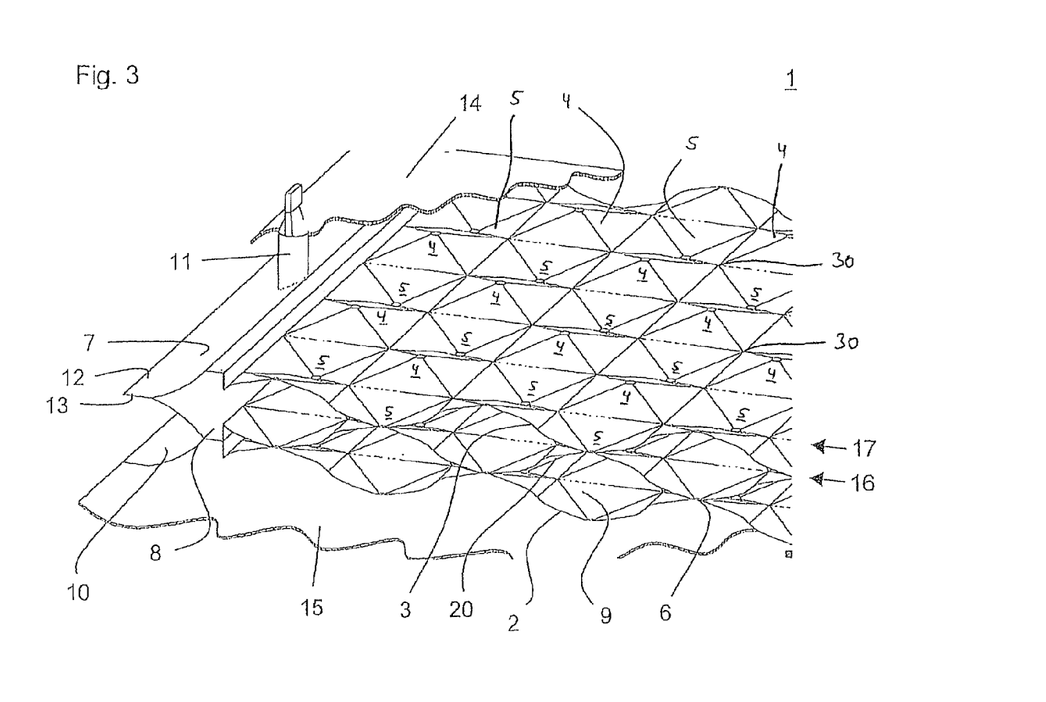
FIG. 3 A partially cut-away perspective view of a triple layered vacuum insulation element.

In FIG. 3, a triple layered vacuum insulation element 1 is shown, of molded plates 2, 3 having an identical structure to the molded plates 2, 3 described in FIGS. 1 and 2.

However, differing from FIGS. 1 and 2, three molded plates 2, 3, 20 are arranged here on top of each other in a mirror symmetrical manner. In this case, mirror symmetric is understood to mean that the bottom plate 2 has a "face-up" orientation, the middle plate 20 has a "face-down" orientation, and the top plate 3 has again a "face-up" orientation. As a result, the bottom plate 2 and the top plate 3 have a parallel arrangement.

Figure 4:
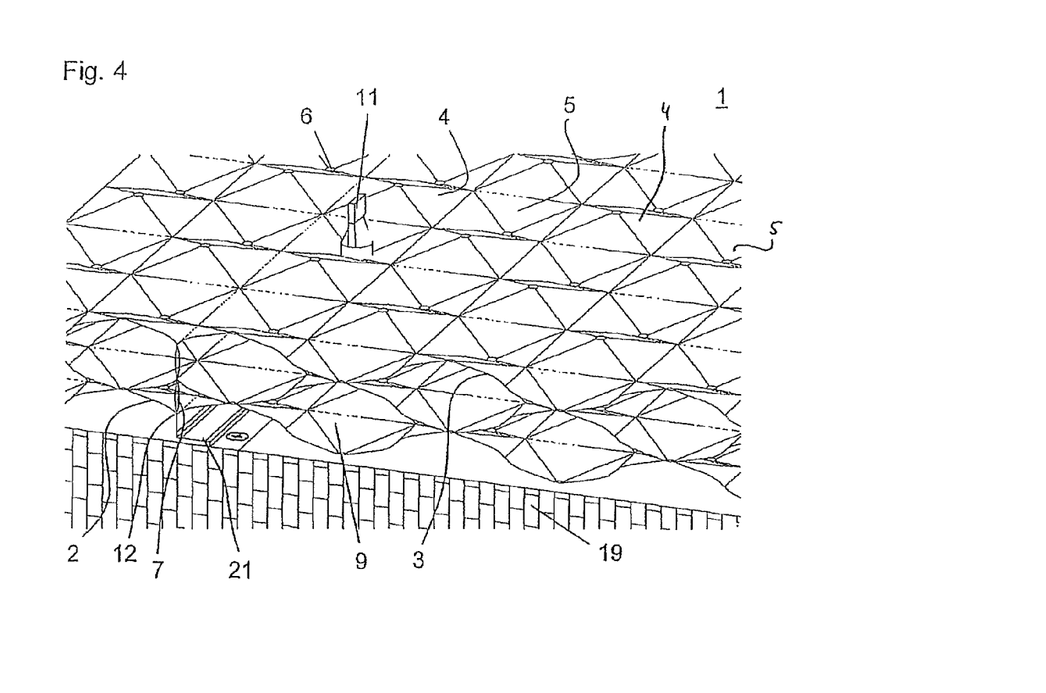
FIG. 4 A partially cut-away perspective view of a triple layered vacuum insulation element, attached to an outer wall.

FIG. 4 shows a triple layered vacuum insulation element 1 like that in the description of FIG. 3, as an outer wall covering. The illustration is in part cut-away for purposes of clarity.

In a deviation from the embodiment described in FIG. 3, the suction nozzle 11 for establishing the vacuum in the vacuum insulation element 1 is not integrated in the surrounding edge region 7, but instead, is located in a depression 4 of the molded plate 3. The surrounding edge region 7 in this preferred embodiment bent somewhat perpendicularly to the longitudinal direction of the molded plates 2, 3 in order that two vacuum insulation elements 1 in accordance with the invention can be arranged next to each other without a gap. The frame region 7 extends at the bottom of the vacuum insulation element 1 beyond the outmost extended projecting structural elements, or, therefore, the depressions 5 of the bottom molded plate 2 and forms there a molded installation edge 18.

The molded installation edge 18 serves for the attachment of the vacuum insulation element 1 to the outer wall of the building 19. As is shown in detail in FIG. 5, the vacuum insulation elements 1 have at the top and bottom in each case an angled mounting strip 21 which can be hung on the outer wall by means of screws 25 inserted in said. It is understood however any other suitable mounting system is equally acceptable.

Figure 5:
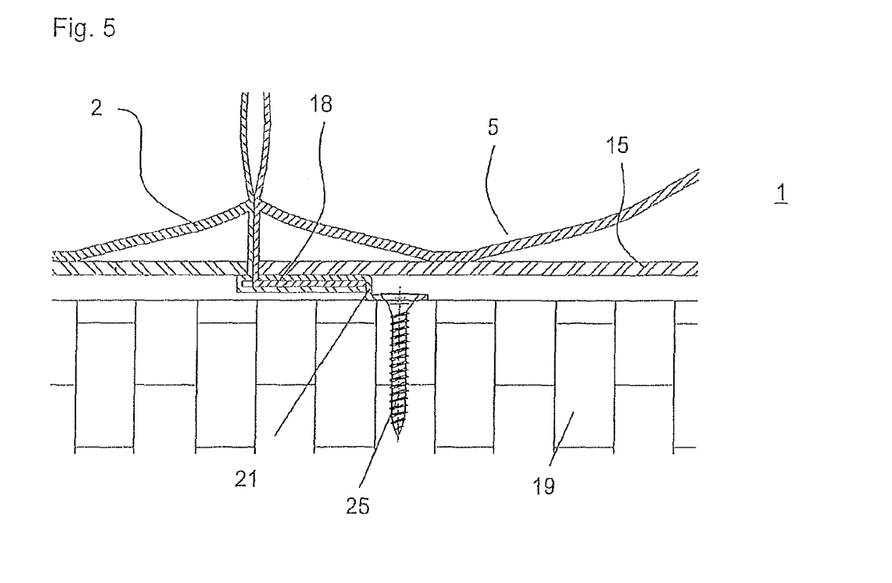
FIG. 5 A detail of FIG. 4—mounting on the outer wall.

The installation edge 18 is shaped such that the vacuum insulation element 1 only comes into contact with the outer wall of the building 19 which is to be insulated at the installation edge 18, or respectively the mounting strip 21. The other parts of the vacuum insulation element 1 do not touch the wall of the building 19. An arrangement of this type minimizes a potential heat transfer between the vacuum insulation element 1 and the building wall 19 and thereby serves to improve the insulating effect.

Figure 6:
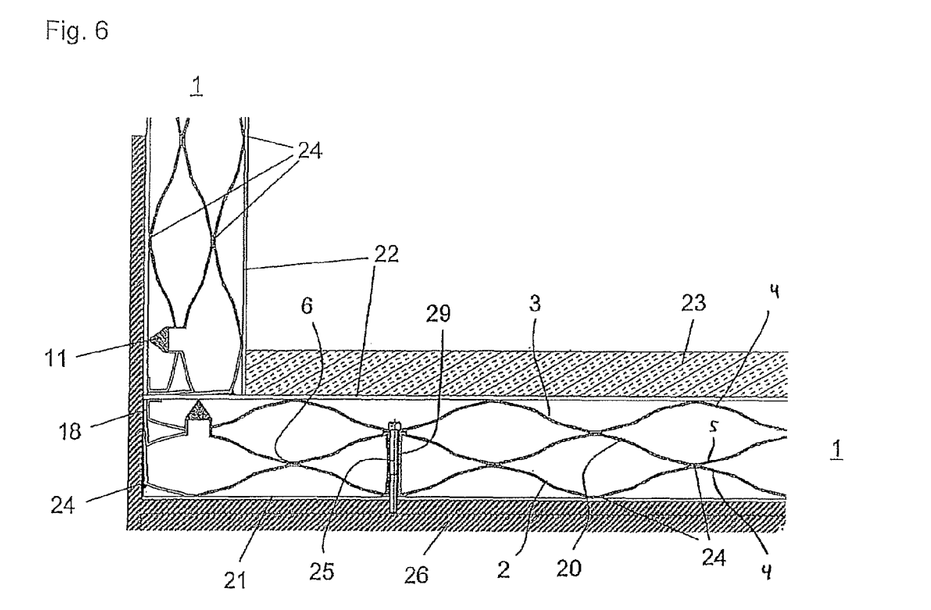
FIG. 6 A cross-section of the wall and floor construction of a temperature controlled vehicle construction, which is insulated with triple layered vacuum insulation elements.

FIG. 6 shows a cross-section of a triple layered vacuum insulation element 1 which is suited for use in temperature controlled constructions on trucks. This embodiment can also be used for insulating containers which are intended for temperature controlled transportation.

The triple layered vacuum insulation elements 1 consist of, as is described in FIG. 3, three molded plates 2, 3, 20 which in each case have a differently molded installation edge 18. The installation edge 18 shown in this illustration runs in this example expediently, perpendicular to the surface of the plate and is shaped such that it has the largest possible contact surface on the face of the frame construction that it is glued to. In order to bond the vacuum insulation element permanently, to the greatest extent possible, to the sub-structure, in this case a U-bracket 26, all depressions of the molded plate 2 and all projections of the molded plate 3 are glued to the frame structure 22 of fiberglass reinforced plastic panels and the molded plates are also glued at the dot-shaped contact surfaces to each other (glue 24).

In addition to the gluing, the vacuum insulation element 1 installed in the flooring is firmly bolted with a screw 25 to the sub-structure of the floor, a U-bracket 26, wherein the screw 25 extends through a tube 29 in the vacuum insulation element 1. The tube 29 is a composite element, wherein the individual tube sections or tube components are molded parts of the three molded plates 2, 3, 20 which, when connected to each other, form a tube 29 extending through the vacuum insulation element 1. The tube sections which are glued or welded together are connected in a vacuum-tight manner such that a permanent vacuum in the vacuum insulation element 1 can be generated. In addition, a floor lining 23 is applied to the frame structure 21 of the floor.

The triple layered vacuum insulation element 1 in FIG. 6 is permanently installed and has therefore an integrally molded suction nozzle 11. The vacuum insulation elements 1 are shown in the voided state, wherein the suction nozzles are permanently welded closed.

Figure 7:
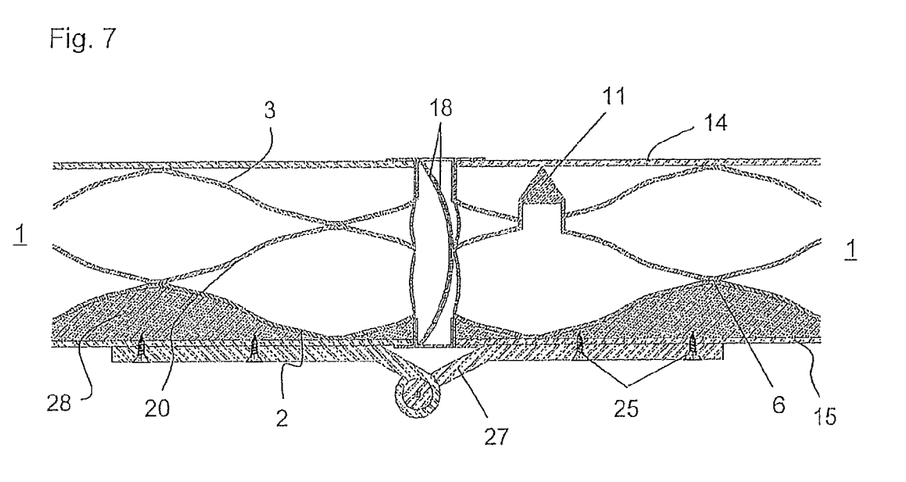
FIG. 7 A cross-section of a triple layered vacuum insulation element with a hinge.

FIG. 7 shows a cross-section of two vacuum insulation elements 1 according to the invention which can be moved in relation to each other by means of a hinge 27. The vacuum insulation elements 1 are connected to the hinge with screws 25, wherein, to improve stability, the space between the vacuum insulation elements 1 and the lower cover plates 15 is filled with a PU-foam 28. The installation edges 18 of the two vacuum insulation elements 1 serve in this embodiment to produce a sealed surface when the hinge 27, as it is shown in the illustration, is not bent. If, in contrast, the hinge 27 is in the bent position, the curvatures of the installation edges 18, which are fitted to each other, on the two vacuum insulation elements 1 form a frictionless separation along the molded installation edges 18.

Vacuum insulation elements 1 mounted on hinges, such as is shown in FIG. 7, can be used for sectional doors, for example, in large production halls or similar structures. The faces can deviate thereby from perpendicular, and can, for example, as shown in FIG. 7, be rounded or angled.

Figure 8:
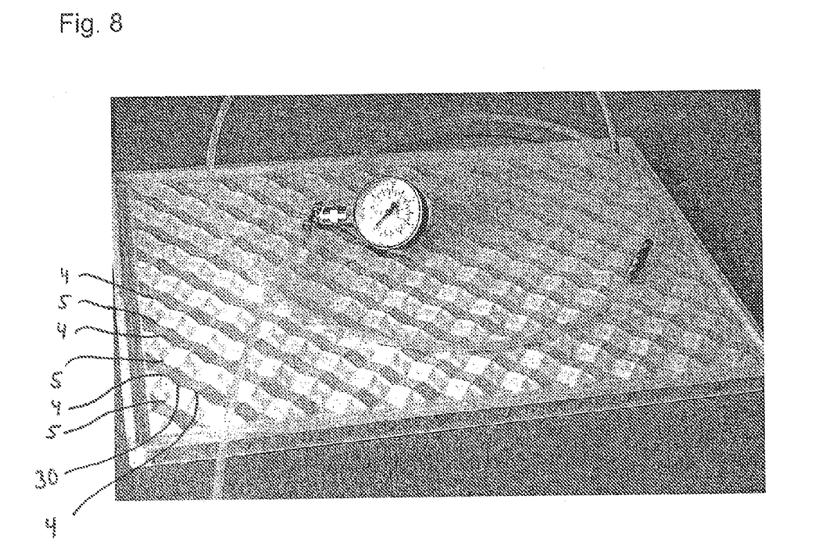
FIG. 8 A photograph of a vacuum insulation element with pyramid shaped structural elements—not subjected to vacuum.
Figure 9:
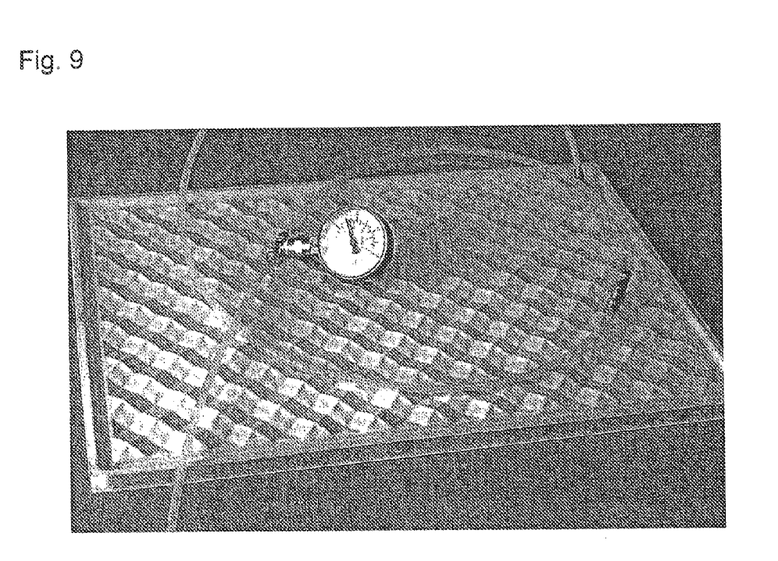
FIG. 9 A photograph of the vacuum insulation element in FIG. 8—subjected to vacuum.

The FIGS. 8 and 9 show photographs of double layered vacuum insulation elements 1 in accordance with the invention which are structured in a pyramid-like manner and are arranged minor symmetrically to one another. The molded plates are made of 1 mm thick polystyrene plates. In FIG. 8, the insulation element 1 is shown in the inflated state; the manometer shows a pressure of 0 bar. In FIG. 9, the same vacuum insulation element 1 is shown, but in the voided state; the manometer shows a vacuum of approx. −0.9 bar. The comparison of the two photographs shows that the vacuum insulation element 1 is fully stable even when subjected to a vacuum.

Figure 10:
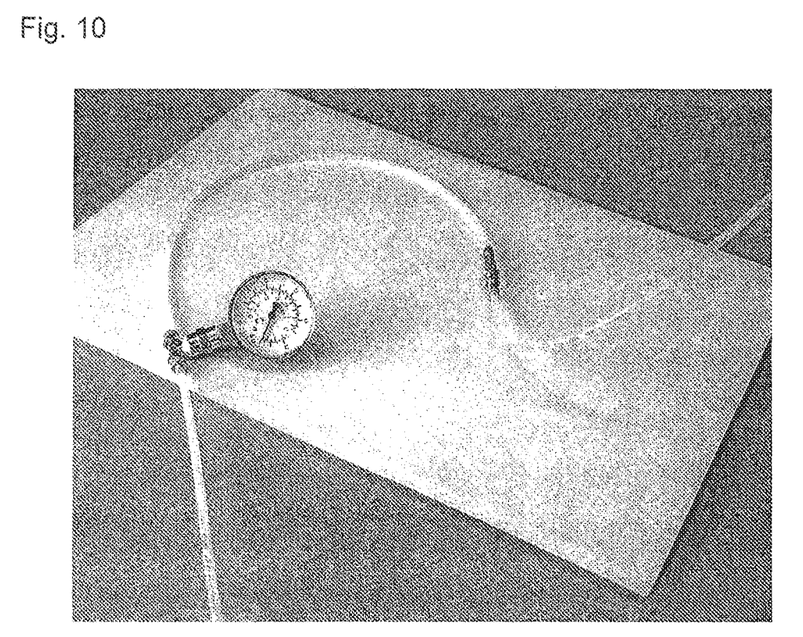
FIG. 10 A photograph of a comparison, wherein one plate has pyramid shaped structural elements and the second plate is not molded—not subjected to vacuum.
Figure 11:
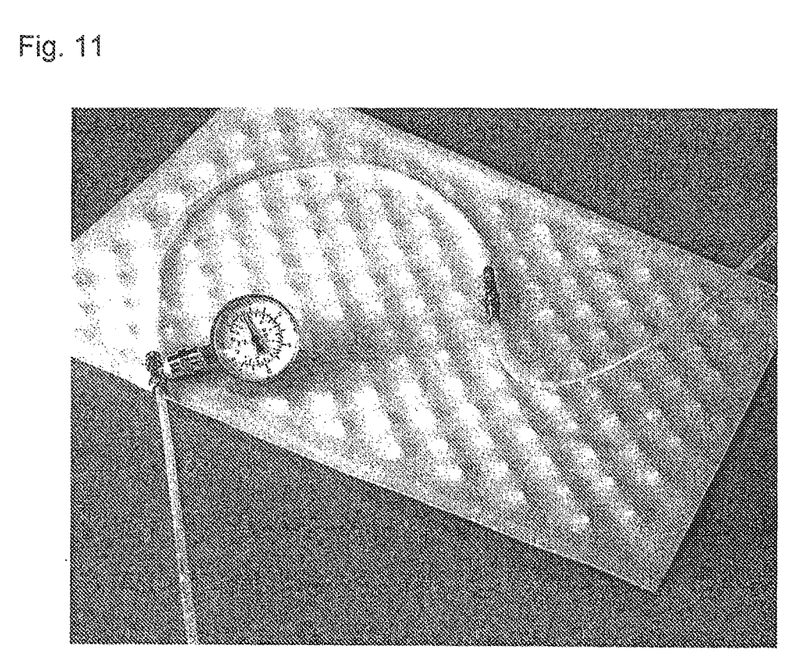
FIG. 11 A photograph of the comparison in FIG. 10—subjected to vacuum.

To illustrate the stability of the shape of the vacuum insulation element 1 in accordance with the invention, the FIGS. 10 and 11 show a comparison image consisting of a molded plate on the bottom and a plate on top which is not molded. The plates used here are also made of 1 mm thick polystyrene. In FIG. 10 the configuration is inflated, as can be seen by the 0 bar reading on the manometer. In FIG. 11, the same configuration in the voided state; the vacuum is slightly above −0.8 bar. The upper, un-molded plate does not retain its shape when subjected to a vacuum, but rather has "clung to" the shape of the molded plate lying beneath it. The entire configuration is warped, and the lower right edge is bent upwards.

The invention claimed is:

1. A vacuum insulation element (1), that includes:
a multi-layer arrangement which can be subjected to a vacuum which contains at least two molded plates (2, 3), wherein
the molded plates (2, 3) have, in each case, a surrounding edge region (7) which, in each case forms a sealing surfaces (13), wherein the sealing surface (13) of the molded plates (2, 3) are hermetically bonded to each other in the assembled state thus forming a sealing frame (12), such that a cavity between the, at least two, molded plates (2, 3) is sealed in a vacuum-tight manner, and wherein
the structure of the, at least two, molded plates (2, 3) distributes the effective atmospheric pressure in such a manner on the molded plates (2, 3) when in the voided state that the specified structure remains stable, wherein the molded plates (2, 3) have numerous molded structural elements which extend in opposite directions from molded plates in the form of alternating projections (4) and depressions (5) and
wherein the projections (4) of the first (2) of the two plates and the corresponding depressions (5) of the second (3) of the two plates lying on top of each other form opposing point positions formed out of plate material, which rest against each other in the voided state thus forming a dot-grid of support points and
wherein the depressions (5) of the first plate (2) and the corresponding projections (4) of the second plate (3) point away from each other forming numerous cavity cells (9) between the support points which can be subjected to a vacuum, wherein the cavity cells (9) are interconnected such that when taken as a whole, form the cavity.

2. A vacuum insulation element (1) according to claim 1, characterized in that the projections (4) and the depressions (5) of both plates (2, 3) are molded from the respective plates in a dome shaped shape in two dimensions and the dome shaped projections (4) and the dome-like depressions (5) are arranged in an alternating manner in both dimensions of the plane of the plate in such a manner that the dome shaped projections (4) are in each case neighbored by dome shaped depressions (5) in both dimensions of the plane of the plate on each side.

3. A vacuum insulation element (1) according to claim 1 or 2, characterized in that the dome shaped depressions (5) of the first plate (2) and the corresponding dome shaped projections (4) of the second plate (3) form molded point positions from plate material between the which, in each case, one of the cavity cells (9) is formed.

4. A vacuum insulation element (1) according to claim 1, characterized in that a saddle point (30) is located in each case on each of the molded plates (2, 3) between two neighboring projections (4).

5. A vacuum insulation element (1) according to claim 1, characterized in that the multi-layer configuration which can be subjected to a vacuum has one or more molded installation edges (18) which can be attached to the object which is to insulated or a frame structure (22) such that the multi-layer configuration in the installed state is separated at a distance from the object or the frame structure (22).

6. A vacuum insulation element (1) according to claim 1, characterized in that the cavity cells (9) which form the cavity between the supported regions have a dome shaped structure.

7. A vacuum insulation element (1) according to claim 1, characterized in that the molded plates (2, 3) are identically structured and connected in a mirror symmetric manner.

8. A vacuum insulation element (1) according to claim 1, characterized in that the molded plates (2, 3) have pyramid shaped structures.

9. A vacuum insulation element (1) according to claim 7 or 8, characterized in that the mirror symmetrically configured molded plates (2, 3) have structures of rows of four-sided pyramids (16, 17) having a square base which abut on opposite sides of the bases and wherein
the peaks of the pyramid rows (16, 17) point alternately upwards and downwards from the plane of the plate and the bases abut at opposite sides and
the pyramid rows (16, 17) are arranged next to each other such that the peaks of the pyramids alternately point upwards and downwards and
the bases of neighboring pyramid rows lie in a common plane.

10. A vacuum insulation element (1) according to claim 9, characterized in that three or more identical, molded plates (2, 3, 20) are connected to each other in a mirror symmetrical manner such that on a face-up positioned plate (2) a face-down positioned plate (20) is placed and on a face-down positioned plate (20) a face-up positioned plate (3) is placed, such that between two neighboring plates, in each case, a cavity is formed and the cavities lying on top of each other are offset.

11. A vacuum insulation element (1) according to claim 1, characterized in that the sealing surfaces (13) of the molded plates (2, 3, 20) are bonded together with airtight glue or that the molded plates are welded together along the sealing frame (12) in an airtight manner.

12. A vacuum insulation element (1) according to claim 1, characterized in that the vacuum insulation element (1) has at least one valve or an integrally molded suction nozzle (11), with which the connected cavity cells (9) between the molded plates (2, 3, 20) can be subjected to a vacuum by means of a vacuum pump, or inflated.

13. A vacuum insulation element (1) according to claim 9, characterized in that the vacuum insulation element (1) consists of at least three molded plates (2, 3, 20) wherein the individual molded plate (20), or numerous molded plates (20) which are located between the two outer molded plates (2, 3), have at least one opening in each case which enables the voiding or inflating all cavities of the vacuum insulation element (1) by means of a single valve or and integrally molded suction nozzle (11).

14. A vacuum insulation element (1) according to claim 1, characterized in that between the, at least two, molded plates (2, 3) an air permeable intermediate plate is inserted, wherein the intermediate plate enables a higher production tolerance in that the opposing supporting projections (4) and depressions (5) do not need to be exactly placed on top of each other, in order to ensure that the specified structure remains stable in the voided state.

15. A vacuum insulation element (1) according to claim 1, characterized in that on one of both of the outwards facing surfaces of the outer molded plates (2, 3) of the vacuum insulation element (1) a cover plate (14, 15) or a cover foil is applied.

16. A vacuum insulation element (1) according to claim 15, characterized in that the cover plates (14, 15) or the cover foil consists of a transparent material is attached to the outer surface of the outer molded plate in such a manner that it does not allow dust to enter.

17. A vacuum insulation element (1) according to claim 1, characterized in that a first molded installation edge (18) on one side of the vacuum insulation element (1) extends beyond the outermost projecting structural element and is attached to the object to be insulated, wherein the vacuum insulation element (1) only touches the object to be insulated at the installation edge (18).

18. A vacuum insulation element (1) according to claim 1, characterized in that a first installation edge (18) on one side of the vacuum insulation element (1) extends beyond the outermost projecting structural element and serves for the installation on the object to be insulated, and a second molded installation edge (18) on the other side of the vacuum insulation element (1) extends beyond the outermost projecting structural element and enables the installation of a covering or coating.

19. A vacuum insulation element (1), according to claim 1, which includes:
   a multi-layer configuration which can be subjected to a vacuum, consisting of at least two molded plates (2, 3), wherein
   the molded plates (2, 3) in each case have a surrounding edge region (7) which in each case forms a sealing surface (13), wherein the sealing surfaces (13) of the molded plates (2, 3) are hermetically bonded together in the assembled state thereby forming a sealing frame (12), such that a cavity is sealed between the, at least two, molded plates (2, 3) which is vacuum-tight, and wherein
   the structure of the, at least two, molded plates (2, 3) distributes the atmospheric pressure affecting the multi-layer configuration of the molded plates in the voided state such that the specified structure remains stable, wherein
   the molded plates (2, 3) have numerous structural elements of alternating projections (4) and depressions (5) which extend in opposite directions from the molded plates (2, 3) and
   in the voided state the projections (4) or respectively, depressions (5), which respectively facing in the direction of the other plate, rest against each other, thereby forming a grid of support points, and
   the respective projections (4) or respectively, depressions (5) facing away from the other plate form numerous cavity cells (9) between the support points which can be subjected to a vacuum, wherein the cavity cells (9) are connected in such a manner that they communicate with one another, forming a cavity as a whole.

* * * * *